Patented Dec. 7, 1943

2,336,131

UNITED STATES PATENT OFFICE 2,336,131

PROCESS OF PREPARING SILVER ALLANTOINATE

Charles F. Schaffer, Philadelphia, Pa.

No Drawing. Application November 25, 1940, Serial No. 367,052

2 Claims. (Cl. 260—299)

This invention has to do with the provision of a novel compound intended for medicinal purposes, and is also concerned with the process of preparing the same.

Silver nitrate is well recognized for its germicidal properties. However, when directly applied to the human body it has marked erosive and irritating effects. Because of this well recognized condition it is generally accepted as undesirable to treat the membranes of the eyes, ears and throat, as well as those of the genitourinary system, with any preparations containing silver nitrate. In view of the benefits which may be obtained by the germicidal qualities of silver compounds, there have been provided such silver compounds as silver-proteinate for treatment of the above-listed parts of the human body.

However, such silver-proteinate preparations have not proven to be entirely satisfactory, because if for any reason there should be traces of the silver nitrate present in the preparation there is a decided irritating effect on the membranes, and the damage which may be caused is greatly enhanced if there should be any lesions in the membranes. As a practical matter the silver-proteinate preparations which are now sold to the public very often carry such traces of silver nitrate, which condition may be largely due to faulty preparation of the compound.

In view of the foregoing conditions this invention has in view, as its foremost objective, the provision of a silver compound which is intended for medicinal use on the membranes of the eye, ear, throat and genitourinary system, and which compound also includes, as an essential element, allantoin. Allantoin is a carbon compound which is recognized as having decided healing qualities on lesions of the membranes.

Another important object of the invention is the provision of a process of preparing silver allantoinate, and which process provides the finished product without any traces of silver nitrate present. Thus not only are the irritating and erosive effects of the silver nitrate avoided, but a compound is provided which affords, at the same time, the germicidal properties of the silver and the healing qualities of allantoin.

Various other more detailed objects and advantages of the invention will in part become apparent, and in part be hereinafter stated, as the description of the invention proceeds.

The invention, therefore, comprises the novel compound of silver allantoinate, and the process of preparing the same.

For a full and more complete understanding of the invention reference may be had to the following description, in which certain quantities of the several ingredients and materials employed are set forth to indicate the proportions which are desirable in preparing silver allantoinate for medicinal use.

Thus, about 100 grams of allantoin ($C_4H_5N_4O_3$) are placed in suspension in 4000 cubic centimeters of water. This suspension is a necessary condition, as only about .6 of 1% of the allantoin will ordinarily go into solution. However, a true solution is established by the addition of 250 cubic centimeters of an aqueous solution of sodium hydroxide (NaOH) in which the sodium hydroxide is present as 20% of the solution. To this solution of allantoin, water and sodium hydroxide is added a solution of 117 grams of silver nitrate ($AgNO_3$) in 150 cubic centimeters of water, together with 25 cubic centimeters of dilute nitric acid ($HNO_3$). This dilute nitric acid is made up of one part of concentrated acid to two parts of water.

A vigorous stirring is now carried out for a short period of time. As a result of the chemical reaction between the various ingredients of the mixture, silver allantoinate is formed, this compound being represented by the formula $C_4H_5N_4O_3AgOH$. The silver allantoinate is then filtered, washed and dried, and the resulting product is in solid form, which by analysis contains substantially 38.19% silver and 61.76% allantoin.

The silver allantoinate provided by the above noted process is entirely free from any traces of silver nitrate, and presents all the germicidal effects of the silver ion. At the same time the compound embodies the well-known healing healing properties for lesions of the allantoin itself.

While a preferred specific embodiment of the invention is hereinbefore set forth it is to be clearly understood that the invention is not to be limited to the proportions of the ingredients and materials specified, because various modifications of these details may be provided in putting the invention into practice within the purview of the appended claims.

I claim:

1. The process of preparing silver allantoinate in which ingredients are employed in proportions represented by the quantities set forth in carrying out the following steps: 100 grams of allantoin ($C_4H_5N_4O_3$) are suspended in 4000 cubic centimeters of water ($H_2O$), a true solution obtained by the addition of 250 cubic centimeters of an aqueous solution of sodium hydroxide (NaOH) in which the sodium hydroxide is present in the amount of 20%, a solution of 117 grams of silver nitrate ($AgNO_3$) and 150 cubic centimeters of water, plus 25 cubic centimeters of dilute nitric acid, (one part of concentrated acid ($HNO_3$), two parts of water) is added, and vigorous stirring carried out for a short period of time.

2. The process of preparing silver allantoinate in which ingredients are employed in proportions represented by the quantities set forth in carrying out the following steps: 100 grams of allantoin ($C_4H_5N_4O_3$) are suspended in 4000 cubic centimeters of water ($H_2O$), a true solution obtained by the addition of 250 cubic centimeters of an aqueous solution of sodium hydroxide (NaOH) in which the sodium hydroxide is present in the amount of 20%, a solution of 117 grams of silver nitrate ($AgNO_3$) and 150 cubic centimeters of water, plus 25 cubic centimeters of dilute nitric acid, (one part of concentrated acid ($HNO_3$), two parts of water) is added, and vigorous stirring carried out for a short period of time after which the steps of filtering, washing and drying are carried out.

CHARLES F. SCHAFFER.